Oct. 17, 1961     H. MONDON     3,004,445
SCREW DRIVE FOR MEASURING INSTRUMENTS
Filed Oct. 14, 1960     2 Sheets-Sheet 1
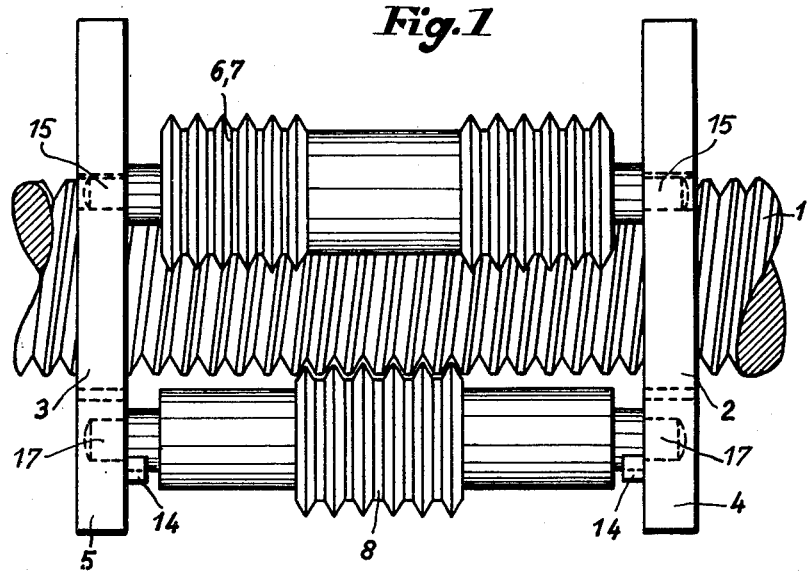
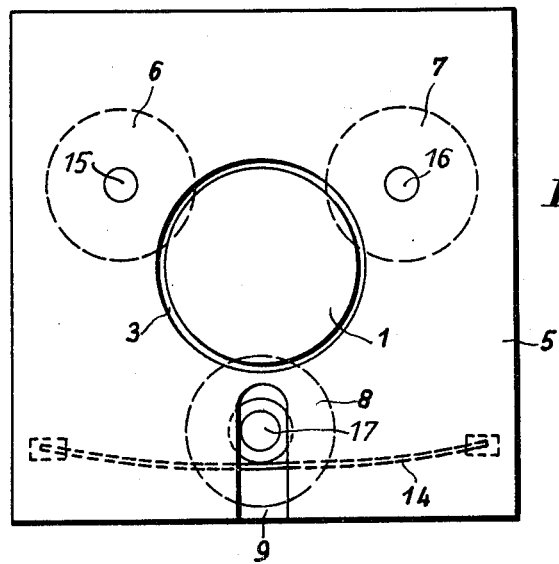

Oct. 17, 1961 H. MONDON 3,004,445
SCREW DRIVE FOR MEASURING INSTRUMENTS
Filed Oct. 14, 1960 2 Sheets-Sheet 2

United States Patent Office 3,004,445
Patented Oct. 17, 1961

3,004,445
SCREW DRIVE FOR MEASURING INSTRUMENTS
Herbert Mondon, Oberkochen, Germany, assignor to Carl Zeiss, Oberkochen (Wuerttemberg), Germany
Filed Oct. 14, 1960, Ser. No. 62,566
Claims priority, application Germany Oct. 14, 1959
4 Claims. (Cl. 74—459)

The invention relates to a screw drive particularly for measuring instruments.

Measuring instruments or the like require the employment of screw drives which on one hand are easily operable and on the other hand require no maintenance and should not develop any lost motion even after extensive use.

Generally known are screw drives provided with lock nuts, but screw drives of this type require constant maintenance because lost motion will develop after a relatively short time. Other screw drives have been devised in which nuts are being employed of which portions are urged by springs or the like either in radial or in axial direction into the thread of the screw. Such screw drives have the disadvantage that a considerable wear on the thread takes place which leads to errors in the measuring results. Finally, there are also screw drives in existence which have the disadvantage that on account of substantial friction in the engaging parts a considerable amount of heat is developed which is not at all desirable in measuring instruments.

For eliminating excessive friction it has been proposed heretofore to arrange balls between the nut and the screw and while this type of screw drives are easily operable and do not develop great friction and heat, they have nevertheless the disadvantage that they can only be made for very short axial movements, because if longer axial movements of the screw are desired, the balls would drop outwardly from the nut.

It is an object of the present invention to overcome all these disadvantages of the conventional screw drives by providing at least two rotatably mounted circumferentially grooved rollers and arranging the same parallel to the screw and in such a manner that the circular ridges formed by the grooves in the rollers enter into the thread of the screw. In addition, means are provided which cause the grooved rollers to be urged against the screw.

When the screw drive is provided in this manner with at least two grooved rollers, there exists between the screw and the grooved rollers solely a rolling friction in similar manner as if rollers would be used between a nut and the screw. Therefore, the screw drive of the invention is very easy to operate and develops only very little heat. An advantage of the invention is that the grooved rollers do not come out of engagement with the screw so that the screw drive of the invention may also be employed for relatively long axial displacements of the screw or the nut, respectively.

Another object of the invention is to provide preferably three grooved rollers in which the circular ridges formed between the grooves are caused to engage the thread of the screw in three circumferentially spaced zones, whereby at least one of these three grooved rollers is yieldably mounted in such a manner that springs or the like may be employed for urging these yieldably mounted rollers in radial direction against the screw. In this manner a constant engagement of the three grooved rollers with the screw is secured.

It is still another object of the invention to provide the screw drive with two rollers provided with circumferentially extending grooves which are brought into engagement with the thread of the screw, and that in addition to these two grooved rollers a magnet is used for attracting the screw into constant engagement with the grooved rollers. Such a screw drive can be used with advantage whenever the load transmission to be produced by the screw drive is not excessive.

The invention will now be described in connection with two embodiments illustrated in the accompanying drawings, in which:

FIG. 1 is a side elevation view of one embodiment of the screw drive;

FIG. 2 is an end view of the structure shown in FIG. 1;

Figure 3:
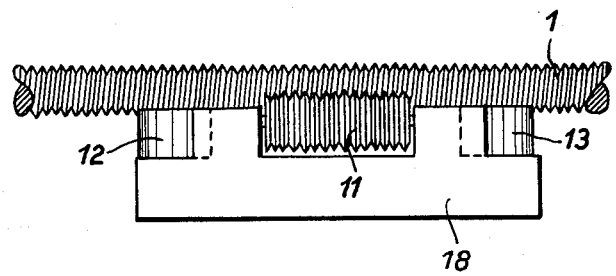
FIG. 3 is a side elevation view of a second embodiment of the screw drive.

Referring to the FIGS. 1 and 2, a horizontally arranged screw spindle 1 extends with both of its ends through axially aligned bores 2 and 3 arranged in two axially spaced parallel plates 4 and 5. These two plates 4 and 5 which are mounted in the spaced arrangement as shown in FIG. 1 constitute parts of a nut structure which latter contains also the circumferentially grooved rollers 6, 7, 8. These rollers are each provided with a series of similar circular ridges and are placed between the two plates 4 and 5 to be freely rotatable. For this purpose the rollers 6 and 7 are provided at their ends with trunnions 15 and 16 which are rotatably supported in bores provided in the plates 4 and 5. It will be noted that the radial shoulders formed between the bodies of the rollers 6 and 7 and the trunnions 15 and 16 are in engagement with the inwardly directed faces of the plates 4 and 5. The other roller 8 is provided with trunnions 17 at both ends, but these trunnions 17 are supported in slots 9 which are arranged radially with respect to the axis of the screw spindle 1. Furthermore, the end portions of the body of the grooved roller 8 adjacent the inner faces of the plates 4 and 5 are engaged, as particularly shown in FIG. 2, by leaf springs 14 which are anchored with their ends to the inner faces of the plates 4 and 5, respectively, in such a manner that the center portion of the leaf spring 14 urges the roller 8 in radial direction against the screw spindle 1. All of the rollers 6, 7 and 8 are arranged in such a manner that their circular ridges engage and remain in engagement with the thread of the screw spindle 1. Therefore, if the screw spindle 1 is rotated, the rollers 6, 7 and 8 are caused to rotate also and the circular ridges move relatively to the thread on the screw spindle 1. This has the result that either the screw spindle 1 is axially displaced or, if the screw spindle 1 is mounted in such a manner that an axial displacement of the same is not possible, the entire nut structure consisting of the parts 4, 5, 6, 7 and 8 is moved in axial direction relatively to the screw spindle 1.

Figure 4:
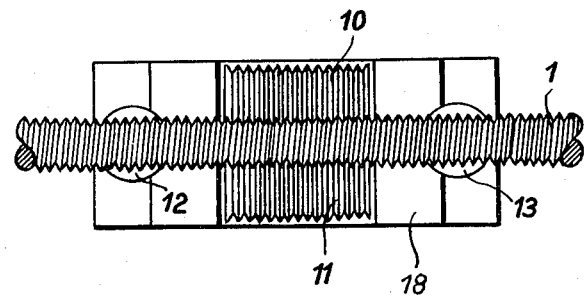
FIG. 4 is a top elevation view of the structure shown in FIG. 3.

The FIGS. 3 and 4 illustrate another embodiment of the screw drive of the invention. This particular screw drive is provided with two circumferentially grooved rollers 10 and 11, the circular ridges of which are in constant engagement with the thread of the spindle 1. In this embodiment the screw spindle 1 is transversely moved by the magnets 12 and 13 attached to the base 18 in a direction in which the screw spindle 1 comes into engagement with the rollers 10, 11. The latter are rotatably mounted in the base 18 of the device in such a manner that their axis of rotation is always parallel to the axis of rotation of the screw spindle 1. It will be noted that in this modified construction of the nut structure 10, 11, 12, 13 the operation of the screw drive is the same as the one described in connection with the FIGS. 1 and 2.

What I claim is:

1. In a screw drive, a screw spindle, three rollers arranged parallel to said screw spindle and provided each with a series of circular ridges entering the helical groove formed by the thread on said screw spindle, means for rotatably supporting said rollers in the position in which said circular ridges engage the thread of said spindle whereby upon rotation of said screw spindle a relative axial displacement takes place between said screw spindle and said rollers, and means for urging at least one of said rollers in radial direction yieldably in engagement with said screw spindle.

2. In a screw drive, a screw spindle, two spaced and parallel bearing plates provided with axially aligned bores through which said screw spindle extends with both its ends, at least two rollers provided with a series of circular grooves arranged parallel to said screw spindle and engaging with their circular ridges formed by said grooves the thread of said spindle, trunnions on both ends of said two rollers and rotatably supported in said bearing plates, and means for yieldably urging at least one of said rollers in radial direction in engagement with said screw spindle.

3. In a screw drive, a screw spindle, two spaced and parallel bearing plates provided with axially aligned bores through which said screw spindle extends with both its ends, three rollers provided with a series of circular grooves arranged parallel to said screw spindle and engaging with their circular ridges formed by said grooves the thread of said spindle, trunnions on both ends of said two rollers and rotatably supported in said bearing plates, and springs engaging at least one of said rollers for urging the same radially in engagement with said spindle.

4. In a screw drive, a screw spindle, two rollers arranged parallel to said screw spindle and provided each with a series of circular ridges entering the helical groove formed by the thread on said screw spindle, means for rotatably supporting said rollers in the position in which said circular ridges engage the thread of said spindle, and magnetic means for urging said screw spindle in engagement with said two rollers.

References Cited in the file of this patent

UNITED STATES PATENTS

| | | |
|---|---|---|
| 511,679 | Buckley | Dec. 26, 1893 |
| 522,249 | Buckley | July 3, 1894 |
| 2,131,151 | Smith | Sept. 27, 1938 |
| 2,734,392 | Falk | Feb. 14, 1956 |
| 2,831,363 | Lohr | Apr. 22, 1958 |
| 2,924,112 | Martens | Feb. 9, 1960 |

Notice of Adverse Decision in Interference

In Interference No. 93,700 involving Patent No. 3,004,445, H. Mondon, Screw drive for measuring instruments, final judgment adverse to the patentee was rendered Feb. 28, 1964, as to claims 1, 2 and 3.

[*Official Gazette April 28, 1964.*]